US010654435B2

(12) United States Patent
Butts et al.

(10) Patent No.: US 10,654,435 B2
(45) Date of Patent: May 19, 2020

(54) SENSOR MODULE FOR USE IN LOW-COST WEIGHT MEASUREMENT AND SENSING SYSTEM

(71) Applicant: BGM Engineering, Inc., Shelby Township, MI (US)

(72) Inventors: Lawrence Dale Butts, Shelby Township, MI (US); Joseph Francis Mazur, Leonard, MI (US); Louis Raymond Brown, Oxford, MI (US)

(73) Assignee: BGM Engineering, Inc., Shelby Township, MI (US)

( * ) Notice: Subject to any disclaimer, the term of this patent is extended or adjusted under 35 U.S.C. 154(b) by 224 days.

(21) Appl. No.: 15/843,795

(22) Filed: Dec. 15, 2017

(65) Prior Publication Data
US 2018/0238731 A1 Aug. 23, 2018

Related U.S. Application Data

(60) Provisional application No. 62/600,423, filed on Feb. 22, 2017.

(51) Int. Cl.
*B60N 2/00* (2006.01)
*B60N 2/015* (2006.01)
(Continued)

(52) U.S. Cl.
CPC ........ *B60R 21/01526* (2014.10); *B60N 2/002* (2013.01); *B60N 2/015* (2013.01);
(Continued)

(58) Field of Classification Search
CPC .. B60N 2/002; B60N 2/015; B60R 21/01526; B60R 21/01512; B60R 21/0153;
(Continued)

(56) References Cited

U.S. PATENT DOCUMENTS 5,573,269 A 11/1996 Gentry et al.
5,905,210 A * 5/1999 O'Boyle ............ G01G 19/4142
177/136
(Continued)

FOREIGN PATENT DOCUMENTS

DE 4237072 * 12/1993
JP 2008170455 * 7/2008

*Primary Examiner* — Jacques M Saint Surin
(74) *Attorney, Agent, or Firm* — Gunther J. Evanina; Butzel Long PC

(57) ABSTRACT

A sensor module for use in a low-cost weight-measurement and sensing system is provided. The sensor module may include a substrate configured to be mounted between a floor pan of a vehicle and a seat of the vehicle. The sensor module may further include a force sensing element disposed upon the substrate. The force sensing element may be configured to sense a force applied thereupon, and generate a reading representative of the force applied thereupon in response thereto to provide a sensor reading. The sensor module may also include a wiring harness connected to the force sensing element. The wiring harness may be configured to transmit the sensor reading to a control module. The substrate may define an aperture configured to surround a fastening element used to fasten the seat to the floor pan of the vehicle.

20 Claims, 14 Drawing Sheets

(51) Int. Cl.
   *G01G 19/12* (2006.01)
   *B60R 21/015* (2006.01)
   *B60R 21/01* (2006.01)

(52) U.S. Cl.
   CPC .... *B60R 21/0153* (2014.10); *B60R 21/01512* (2014.10); *G01G 19/12* (2013.01); *B60R 2021/01211* (2013.01); *B60R 2021/01272* (2013.01)

(58) Field of Classification Search
   CPC  B60R 2021/01211; B60R 2021/01272; G01G 19/12
   USPC .......................................................... 177/136
   See application file for complete search history.

(56) References Cited

U.S. PATENT DOCUMENTS

| | | | |
|---|---|---|---|
| 6,039,344 A | 3/2000 | Mehney et al. | |
| 6,056,079 A | 5/2000 | Cech et al. | |
| 6,069,325 A * | 5/2000 | Aoki | B60N 2/002 177/136 |
| 6,161,891 A | 12/2000 | Blakesley | |
| 6,244,116 B1 * | 6/2001 | Osmer | G01G 3/1402 177/136 |
| 6,323,444 B1 * | 11/2001 | Aoki | G01G 19/4142 177/144 |
| 6,342,683 B1 | 1/2002 | Aoki et al. | |
| 6,392,543 B2 * | 5/2002 | Maloney | G06K 17/00 340/568.1 |
| 6,508,514 B2 | 1/2003 | Wolfe | |
| 6,578,870 B2 | 6/2003 | Winkler et al. | |
| 6,587,770 B1 | 7/2003 | Gray et al. | |
| 6,764,094 B1 | 7/2004 | Curtis | |
| 6,845,339 B2 | 1/2005 | Winkler et al. | |
| 6,940,026 B2 | 9/2005 | Rundell et al. | |
| 6,989,496 B2 | 1/2006 | Desrochers et al. | |
| 7,143,658 B2 | 12/2006 | Schubert | |
| 2001/0037692 A1 | 11/2001 | Anahid et al. | |
| 2002/0063630 A1 | 5/2002 | Curtis et al. | |
| 2007/0159178 A1 * | 7/2007 | Stanley | B60R 21/01532 324/457 |
| 2014/0194937 A1 * | 7/2014 | Asnis | A61F 2/0811 606/316 |
| 2016/0332590 A1 * | 11/2016 | Monnier | B29C 33/3842 |

\* cited by examiner

SENSOR MODULE FOR USE IN LOW-COST WEIGHT MEASUREMENT AND SENSING SYSTEM

CROSS-REFERENCE TO RELATED APPLICATIONS

This application claims the benefit of U.S. Provisional Application No. 62/600,423, filed on Feb. 22, 2017. The entire disclosure of the application referenced above is incorporated herein by reference.

FIELD

The present disclosure relates generally to weight measurement and sensing systems and, more specifically, to sensor modules for use in low-cost weight-measurement and sensing systems adaptable for use in a variety of vehicles, and methods for using the same.

BACKGROUND

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Conventional vehicular weight measurement and sensing systems are known to be embedded in a seat of a vehicle. For example, one known weight measurement and sensing system includes air bladders and/or strain gauge sensors embedded into seat cushions or a seat frame. Another known weight measurement and sensing system includes strain gauges mounted within a seat assembly between a floor pan and seat tracks. Yet another known weight measurement and sensing system includes sensors located at the four corners of a seat assembly—either in the seat cushions or the seat frame.

However, all of the foregoing types of weight measurement and sensing systems are embedded within the seat of the vehicle. Accordingly, each respective system must be customized for the seat within which it will be embedded. This is known to increase the complexity and cost of weight measurement and sensing systems, which must be specifically tailored to different seat models. Even modest changes to seat size, shape, location, etc. may drastically alter the form and cost of typical weight measuring and sensing systems.

Furthermore, conventional weight measurement and sensing systems are known to report whether an occupant of a vehicle is greater than or equal to 51.6 lbs. (based, for example, on the minimum requirements of the National Highway Traffic Safety Administration), in order to, for example, actuate the deployment of an airbag. In such systems, an airbag may either (i) deploy at a particular strength based, at least in part, on whether the occupant exceeds the 51.6 lbs or (ii) not deploy at all. That is, conventional weight measurement and sensing systems fail to account for the specific weight of an occupant (beyond assessing whether the occupant meets or exceeds the 51.6 lbs) in setting a deployment strength of an airbag.

Accordingly, weight measurement and sensing systems designed to address one or more of the foregoing issues are desired.

SUMMARY

In a feature, a sensor module for use in a low-cost weight-measurement and sensing system is provided. The sensor module may include a substrate configured to be mounted between a floor pan of a vehicle and a seat of the vehicle. The sensor module may further include a force sensing element disposed upon the substrate. The force sensing element may be configured to sense a force applied thereupon, and generate a reading representative of the force applied thereupon in response thereto to provide a sensor reading. The sensor module may also include a wiring harness connected to the force sensing element. The wiring harness may be configured to transmit the sensor reading to a control module. The substrate may define an aperture configured to surround a fastening element used to fasten the seat to the floor pan of the vehicle.

In a feature, the substrate includes at least one tab, and the at least one tab defines a tab aperture. In one example of the foregoing feature, the at least one tab includes a plurality of tabs, and at least some of the plurality of tabs define respective tab apertures.

In one feature, the substrate includes a collar surrounding the aperture, and the collar may be configured to contact a bottom portion of the seat of the vehicle. In one example of the foregoing feature, the collar projects away from the floor pan of the vehicle when the sensor module is mounted between the floor pan and the seat.

In another feature, the force sensing element includes a pattern of interdigitated electrodes. In one example of the foregoing feature, the interdigitated electrodes are substantially arcuate in shape.

In one feature, the force sensing element includes a checkerboard pattern of electrodes. In one example of the foregoing feature, the electrodes are substantially square in shape.

In a feature, the sensor module further includes a printed circuit board disposed upon the substrate and connected to the wiring harness. In one example of the foregoing feature, the printed circuit board includes at least one microprocessor. In another example of the foregoing feature, the sensor module further includes a cover strap disposed upon the printed circuit board. In still another example of the foregoing feature, the cover strap includes a puck configured to be disposed between the force sensing element and the seat when the sensor module is mounted between the floor pan and the seat.

In yet another example of the foregoing feature, the puck may be aligned coaxial with the force sensing element. In another example of the foregoing feature, the puck may be configured to contact the force sensing element on a first side and contact a bottom portion of the seat of the vehicle on second side. In another example of the foregoing feature, the cover strap may be secured to the printed circuit board by a plurality of fastening elements. In another example of the foregoing feature, the plurality of fastening elements include a plurality of rivets.

In one feature, the force sensing element includes a force-sensitive resistor.

In yet another feature, the force sensing element includes at least one of the following types of force sensing elements: (i) an inductive force sensing element; (ii) an accelerometer force sensing element; and (iii) a piezoelectric force sensing element.

In a feature, the force sensing element may be further configured to detect an amplitude or frequency associated with the substrate. According to this example, the reading representative of the force may be based on the detected amplitude or frequency.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
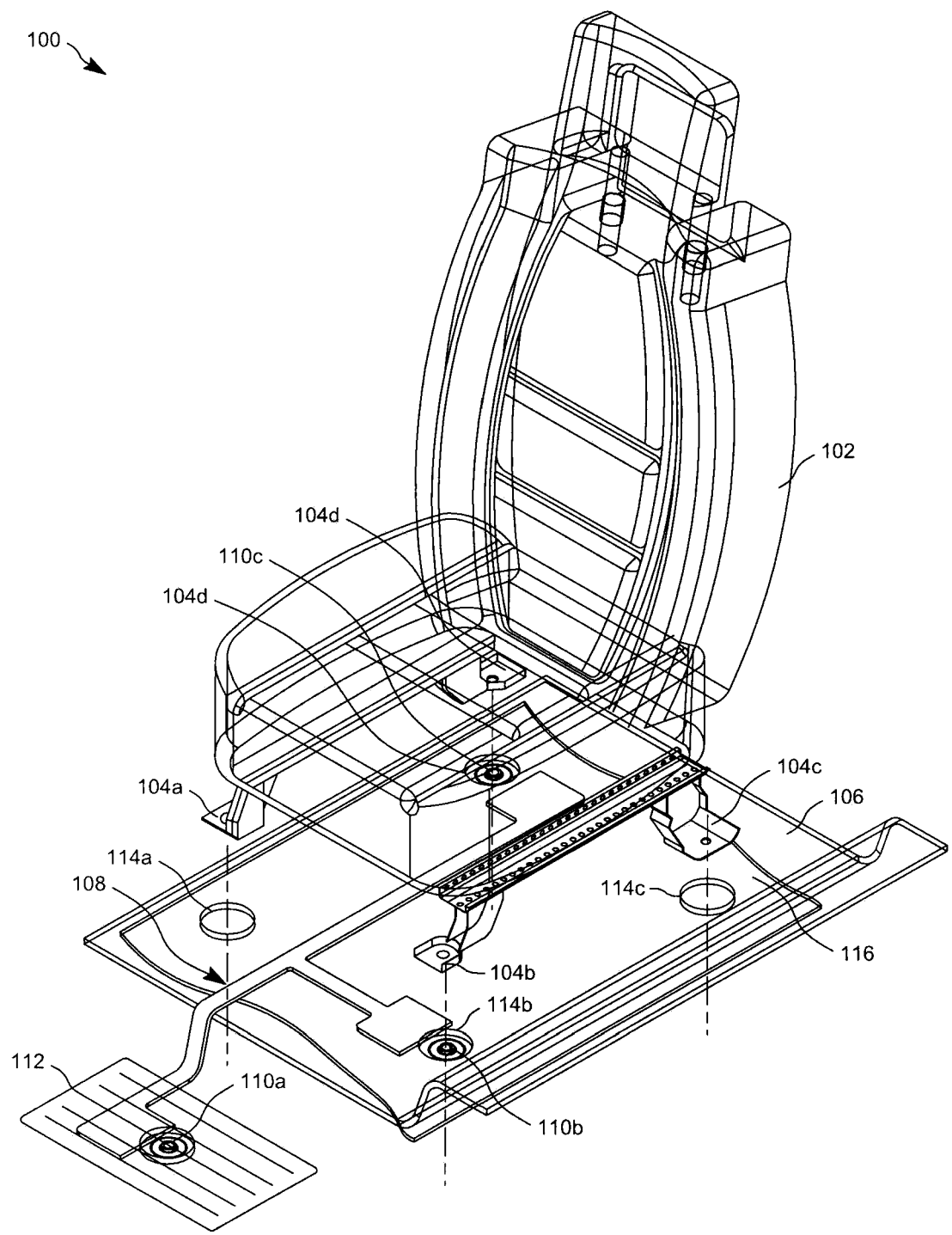
FIG. 1 is an exploded front isometric view of a weight measurement and sensing system mounted between a floor pan and a seat of a vehicle according to one example of the present disclosure.

Referring now to FIG. 1, an exploded front isometric view of a weight measurement and sensing system 108 mounted within a vehicle 100 is shown. The weight measurement and sensing system 108 is mounted between a floor pan 106 and a seat 102 of a vehicle. While the examples that follow describe the weight measurement and sensing system 108 in the context of an automobile (and, more specifically, as residing under one or more seats of an automobile), those having ordinary skill in the art will appreciate that the system 108 may suitably be employed in other contexts and environments including, by way of example and not limitation, airplanes, truck beds, trailers, conveyer systems, etc.

According to one implementation, the system 108 may be configured for mounting between a floor pan 106 and a seat 102 of a vehicle. The seat 102 may include a driver's seat, a front passenger seat, and/or a rear passenger seat. While a single occupant-type seat 102 is depicted in FIG. 1, according to some examples, the system 108 may be installed beneath a multi-occupant-type seat (e.g., a front or rear bench-type seat) in accordance with the principles set forth herein.

As shown in FIG. 1, the seat 102 may include a plurality of mounting feet 104a, 104b, 104c, and 104d. Each of the respective mounting feet 104a, 104b, 104c, and 104d may be configured to be seated in respective contact areas 114a, 114b, 114c, and 114d of the floor pan 106 of the vehicle 100. According to some examples, a floor pan mat 116 may be disposed atop at least a portion of the floor pan 106. However, according to other examples, the floor pan mat 116 may be omitted without substantially altering the function or design of the weight measurement and sensing system 108 described herein.

In the example implementation shown in FIG. 1, the weight measurement and sensing system 108 includes a plurality of sensor modules 110a, 110b, and 110c. A first sensor module 110a is configured for mounting within a foot-well 112 of the floor pan 106 and is configured to, among other things, sense a force applied, for example, by the legs of an occupant of the seat 102. A second sensor module 110b is configured for mounting beneath the front-right mounting foot 104b of the seat 102 and is configured to, among other things, sense a force applied on or near the front of the seat 102 by an occupant of the seat 102. A third sensor module 110c is configured for mounting beneath a back-left mounting foot 104 of the seat 102 and is configured to, among other things, sense a force applied on or near the back of the seat 102 by an occupant of the seat 102.

Although the second sensor module 110b is shown as configured for mounting beneath the front-right mounting foot 104b, according to some implementations, the second sensor module 110b may be suitably configured for mounting beneath the front-left mounting foot 104a of the seat. Similarly, although the third sensor module 110c is shown as configured for mounting beneath the back-left mounting foot 104d, according to some implementations, the third sensor module 110c may be suitably configured for mounting beneath the back-right mounting foot 104c of the seat.

Moreover, although the second sensor module 110b and the third sensor module 110c are shown as being on opposite sides of the seat 102, according to some implementations, the sensor modules 110b, 110c may be configured for mounting on a same side of the seat 102 (e.g., a left side or a right side of the seat 102). Further still, although FIG. 1 only depicts sensor modules 110b, 110c configured for mounting beneath two of the seat's mounting feet 104b, 104d, according to some examples, the system 108 may include one or more additional sensor modules configured for mounting beneath the other mounting feet of the seat 102 (i.e., such that sensor modules are configured for mounting beneath three or more mounting feet of the seat 102). In addition, according to some examples, a seat 102 may not include mounting feet. In such a scenario, the sensor modules may be configured to be mounted beneath one or more contact areas of the seat 102, where the seat makes contact with the floor pan 106 (or the floor pan mat 116, as the case may be).

As shown and discussed in further detail with reference to FIG. 11 herein, when the seat 102 is lowered down for mounting to the floor pan 106 of the vehicle, (e.g., via studs running through respective apertures in the mounting feet 104a, 104b, 104c, and 104d and corresponding apertures in respective contact areas 114a, 114b, 114c, and 114d), one or more portions of the seat 102 (e.g., the mounting feet 104a, 104b, 104c, and 104d) may come into contact with force sensing elements of the second and third sensor modules 110b, 110c. Then, when a person occupies the seat 102, the person's weight may apply forces on force sensing elements of the sensor modules 110a, 110b, and 110c of the system 108.

For example, a person's foot or feet may apply a force to a force sensing element of the first sensor module 110a mounted within the foot-well 112 of the floor pan 106. Similarly, the person's body weight may apply forces to the force sensing elements of the second and third sensor modules 110b, 110c mounted beneath the seat 102. Each of the sensor modules 110a, 110b, and 110c may generate respective readings representative of the force sensed thereupon to provide a plurality of sensor readings. As discussed in further detail below, these sensor readings may be used to, among other things, (i) determine a weight of an occupant of the seat 102 and/or (ii) determine a center of mass of an occupant of the seat 102. Furthermore, according to some implementations, the determined weight and/or center of mass information may be used to adjust a deployment strength of a vehicular safety component associated with the occupant (e.g., an airbag and/or a seat belt retractor). For example, according to certain implementations, the system 108 may include a control module connected to the plurality of sensor modules 110a, 110b, and 110c and configured to determine a weight and/or center of mass of an occupant of the seat 102 based on the plurality of sensor readings.

Figure 2:
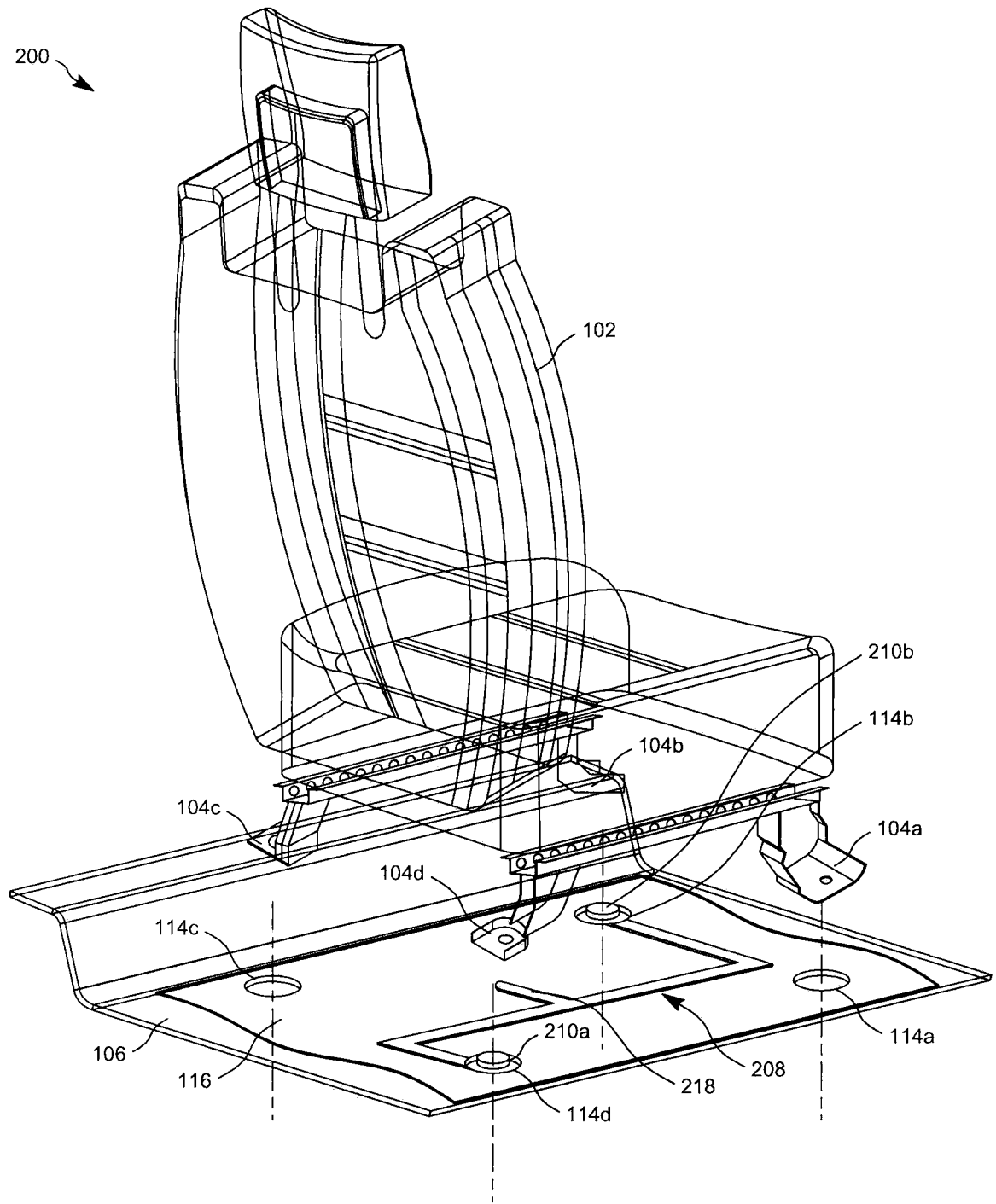
FIG. 2 is an exploded rear isometric view of a weight measurement and sensing system mounted between a floor pan and a seat of a vehicle according to one example of the present disclosure.

Referring now to FIG. 2, an exploded back isometric view of a weight measurement and sensing system 208 mounted within a vehicle 200 is shown. As with the example shown in FIG. 1, the weight measurement and sensing system 208 is mounted between a floor pan 106 and a seat 102 of a vehicle 200. The components of the vehicle 200, including the seat 102 and floor pan 106, are substantially the same as those shown and described with regard to FIG. 1. The system 208 of FIG. 2 is similar to the system 108 of FIG. 1, but with some notable differences.

The system 208 includes a first sensor module 210a configured for mounting beneath the back-left mounting foot 104d of the seat 102 and is configured to, among other things, sense a force applied on or near the back of the seat 102 by an occupant of the seat 102. The system 208 also includes a second sensor module 210b configured for mounting beneath the front-right mounting foot 104a of the seat 102 and is configured to, among other things, sense a force applied on or near the front of the seat 102 by an occupant of the seat 102.

In addition, the system 208 includes a control output interface 218 for interfacing with, for example, a safety systems control module of the vehicle 200. That is, the control output interface 218 may be configured to communicatively couple with a safety systems control module of the vehicle 200. For example, according to some implementations, a control module of the system 208 (not shown in FIG. 2) may be configured to issue a command to the safety systems control module (not shown in FIG. 2) of the vehicle 200 via the control output interface 218 to adjust a deployment strength of a vehicular safety component associated with the occupant (e.g., an airbag or seatbelt retractor) based on the determined weight and/or determined center of mass of the occupant (e.g., as determined by the control module based on the sensor readings from the sensor modules 210a, 210b).

Figure 3:
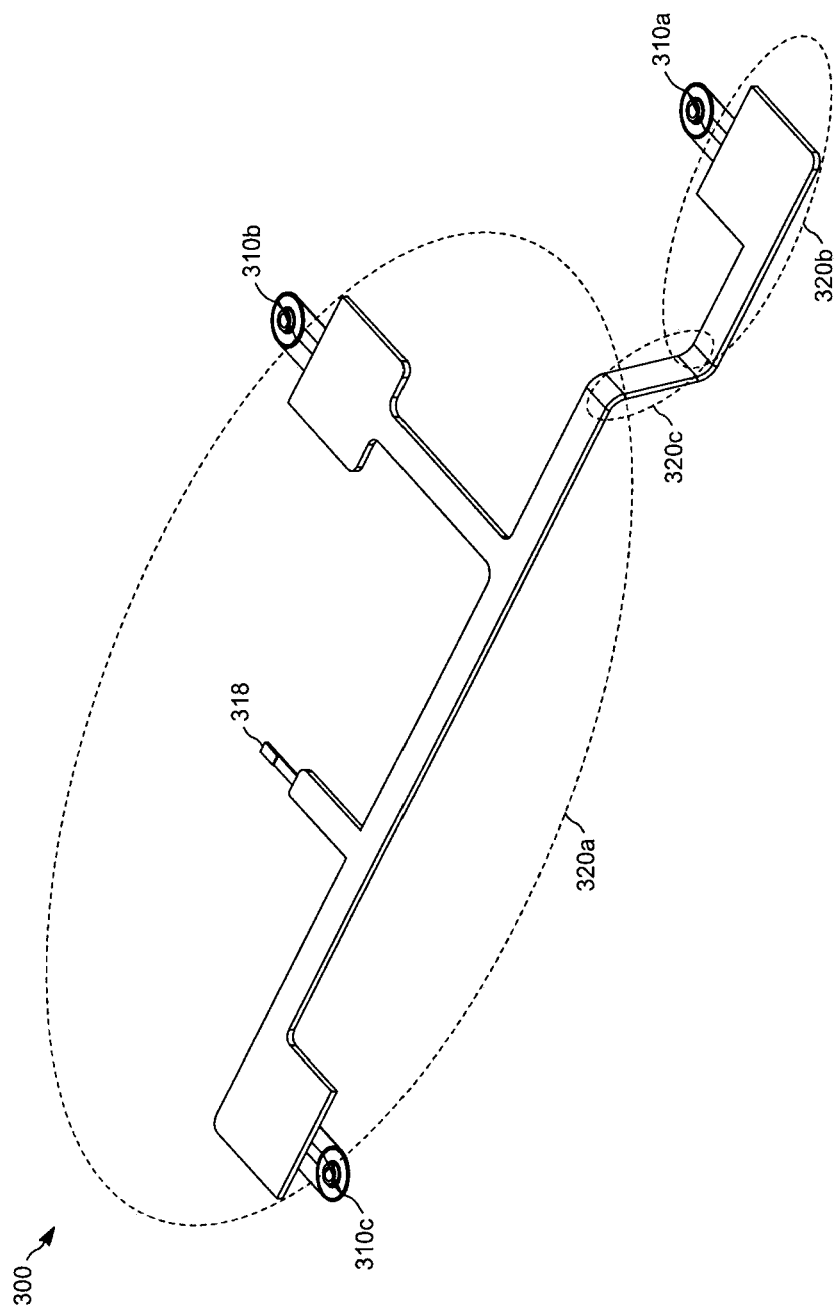
FIG. 3 illustrates a weight measurement and sensing system according to one example of the present disclosure.

Referring now to FIG. 3, one example of a weight measurement and sensing system 300 is shown. The system 300 may be configured to be mounted between a floor pan and a seat of a vehicle, according to one example. The system includes a plurality of sensor modules 310a, 310b, and 310c and a control output interface 318 configured to communicatively couple with, for example, a safety systems control module of a vehicle. The system also includes a housing encapsulating at least a portion of each of the plurality of sensor modules 310a, 310b, and 310c. According to one example, the housing may include an overmolded mat encapsulating a top portion and a bottom portion of each of the plurality of sensor modules 310a, 310b, and 310c. The mat, according to some examples, encapsulates at least a portion of the sensor modules 310a, 310b, and 310c so as to, among other things, protect the sensor modules and the electronics and wiring harnesses associated therewith from debris, such as water, snow, sand and/or mud. According to some examples, the mat may encapsulate some or all of the 310a, 310b, and 310c entirely.

In the example system 300 shown in FIG. 3, the sensor modules 310b, 310c may be located to align with (and, at least partially, surround) fastening elements (e.g., bolts, stud, etc.) used to affix a seat to a floor pan of a vehicle. In this way, the fastening elements used to affix the seat to the floor pan may pass through sensing element components of the sensor modules 310b, 310c, allowing the seat (e.g., the mounting feet of the seat) to rest on the sensing elements themselves.

In addition, in the example system 300 shown in FIG. 3, the housing includes a top portion 320a at a first elevation, a bottom portion 320b at a second elevation below the first elevation, and a transition portion 320c between the top portion 320a and the bottom portion 320b. In this manner, the sensor modules 310b, 310c may be positioned at the first elevation so as to make contact with portions of the seat of the vehicle, while the sensor module 310a may be positioned at a second elevation (e.g., in the foot-well of the floor pan) so as to make contact with an occupant's foot or feet. Furthermore, although only two sensor modules 310b, 310c are shown at the first elevation, according to certain implementations, less or more sensor modules may be included as part of the system 300 at the first elevation. Similarly, although only a single sensor module 310a is shown at the second elevation, according to certain implementations, less or more sensor modules may be included as part of the system 300 at the second elevation. Additional components of the system 300 (including, for example, a control module and internal circuitry connecting the sensor modules to the control module) are shown in additional detail with regard to, for example, FIG. 12 herein.

Figure 4:
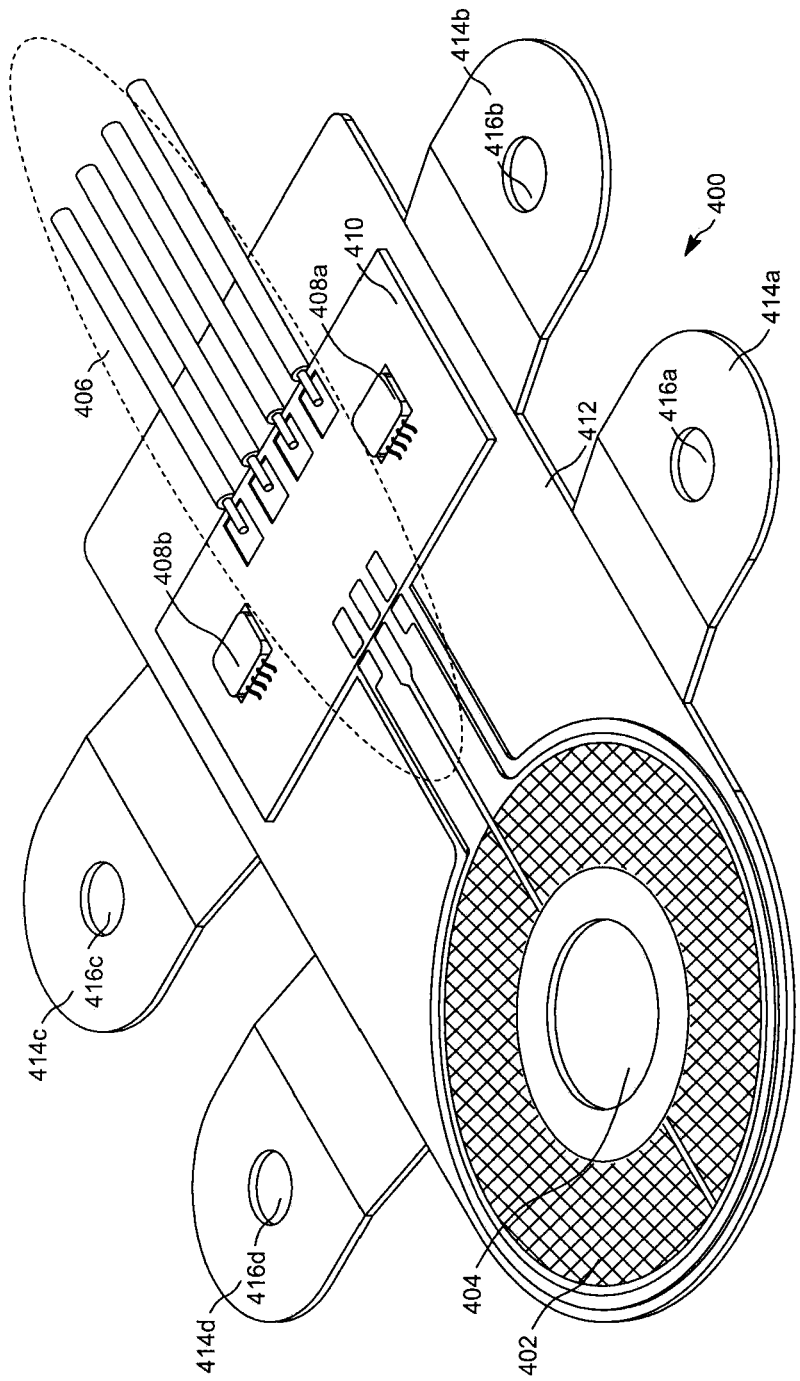
FIG. 4 illustrates a sensor module according to one example of the present disclosure.

FIG. 4 illustrates one example of a sensor module 400 for inclusion as part of a weight measurement and sensing system according to aspects of the present disclosure. For example, one or more sensor modules having the structure of sensor module 400 may be included as part of a weight measurement and sensing system, such as, but not limited to, systems 108, 208, and 300 described above and/or system 1202 described below. The sensor module 400 includes a substrate 412. The substrate 412 is configured to be mounted between a floor pan and a seat of a vehicle. For example, according to one implementation, a bottom side of the substrate 412 (not shown) may be configured to sit atop a floor pan of a vehicle. The substrate 412 may be manufactured from any suitable material including, but not limited to, metal (e.g., steel or the like) and/or plastic. Furthermore, the substrate 412 may define an aperture 404 configured to surround a fastening element (e.g., a stud, bolt, etc.) used to fasten a seat to a floor pan of a vehicle.

The sensor module 400 further includes a force sensing element 402 disposed upon the substrate 412. The force sensing element 402 may be configured to sense a force applied thereupon. In one example, the sensed force may be created by a person occupying a seat, where the force is transferred though the seat to the force sensing element 402 of the sensor module 400. In another example, the force may be transferred directly from a person to the force sensing element, such as when a person's foot or feet contact the force sensing element 402 (e.g., when the sensor module 400 is mounted in a foot well portion of a floor pan of a vehicle). In still another example (which applies to all implementations of sensor modules described herein), the force may be from an inanimate object, rather than from a human being. Nonetheless, the force sensing element 402 may be configured to generate a reading representative of the force applied thereupon in response thereto to provide a sensor reading.

According to some examples, the force sensing element 402 may be anywhere from 8 to 60 mm in diameter. In one example, the force sensing element 402 may be approximately 46.5 mm in diameter.

In addition, the force sensing element 402 may constitute one or more of the following types of force sensing elements: (i) a force sensitive resistor; (ii) an inductive force sensing element; (iii) an accelerometer force sensing element; and (iv) a piezoelectric force sensing element. Although the forgoing types of force sensing elements are described with regard to the example sensor module 400 of FIG. 4, it is understood that one or more of the foregoing types of force sensing elements may be utilized as part of some or all of the various sensor module configurations described herein. Furthermore, according to some example implementations (including the implementation shown in FIG. 4 and the implementations shown in other figures herein), the force sensing element 402 may be configured to detect an amplitude or frequency associated with the substrate 412. In one example of the foregoing implementation, the sensor readings generated by the sensor module 400 may be based on the detected frequency or amplitude.

According to one example where the force sensing element 402 includes a force sensitive resistor, force applied to the force sensing element 402 may cause a resistance to change (i.e., increase or decrease) across electrodes of the force sensitive resistor. This change in resistance may cause a proportional change in voltage across the electrodes of the force sensitive resistor, which voltage may be correlated with a weight of an occupant of a seat (e.g., via a lookup table stored in memory of a control module or the like). As used herein, correlating a voltage with a weight of an occupant may include: (i) determining a specific weight of an occupant (e.g., within a certain tolerance, such as +/−10 lbs) based on voltage readings from one or more sensors and/or (ii) determining a range of a weight of an occupant (e.g., between 90 to 110 lbs, between 110 to 130 lbs, etc.) based on voltage readings from one or more sensors.

The sensor module 400 also includes a wiring harness 406 constituting one or more wires connected to, at least, the force sensing element 402 and configured to, among other things, transmit one or more sensor readings from the sensor module 400 to, for example, a control module (not shown). In addition, the wiring harness 406 may serve to supply power to one or more components (e.g., the force sensing element 402, one or more microprocessors 408a, 408b, etc.) of the sensor module 400.

Figure 5:
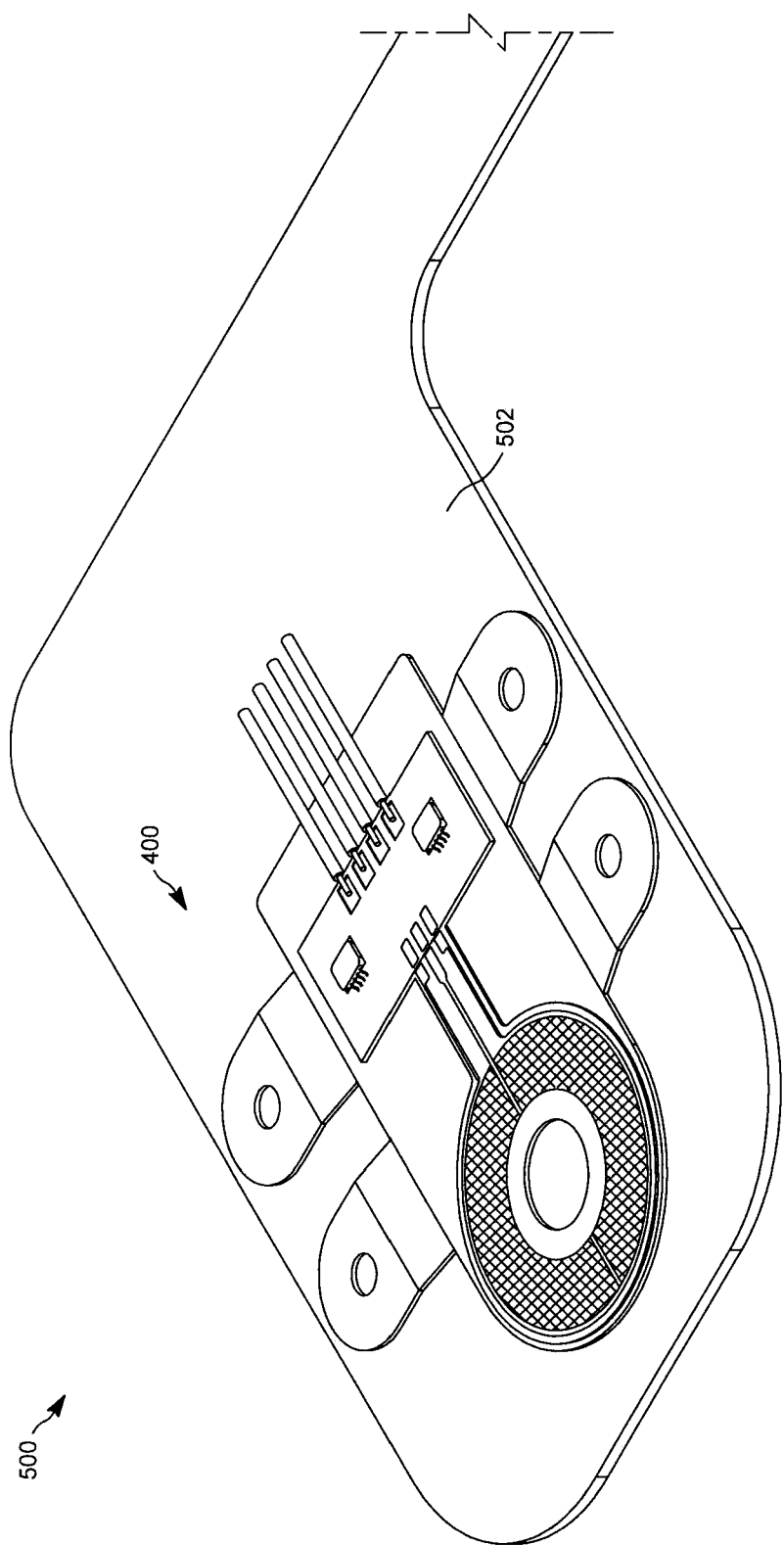
FIG. 5 illustrates a sensor module encapsulated in a mat according to one example of the present disclosure.

According to certain examples, the substrate may include one or more tabs, such as tabs 414a, 414b, 414c, and/or 414d. As used herein, a "tab" may constitute an element that projects or extends outwardly from the substrate 412. According to some examples, one or more of the tabs may be integrally formed as part of the substrate 412. According to other examples, one or more of the tabs may be separate elements configured for connection to the substrate 412 using connection techniques known in the art. The tabs 414a, 414b, 414c, and/or 414d may define respective apertures 416a, 416b, 416c, and/or 416d. The tabs 414a, 414b, 414c, and/or 414d may facilitate the sensor module 400 being included within a housing. For example, the tabs 414a, 414b, 414c, and/or 414d and their respective apertures 416a, 416b, 416c, and/or 416d may facilitate the sensor module 400 being included as part of an over-molded mat, where the apertures 416a, 416b, 416c, and/or 416d may permit plastic or the like to flow through, thereby connecting top and bottom portions of the housing around the sensor module 400. Indeed, FIG. 5 illustrates an exemplary system 500 in which the sensor module 400 of FIG. 4 is encapsulated within a housing 502 (e.g., an over-molded mat-type housing).

Returning to FIG. 4, according to some implementations, the sensor module 400 may include a printed circuit board (PCB) 410 disposed upon the substrate 412. The PCB 410 may serve to connect the electrodes of the force sensing element 402 to the wiring harness 406. In addition, according to some examples, the PCB 410 may include one or more microprocessors, such as microprocessors 408a and 408b. The microprocessor(s) 408a and/or 408b may perform a variety of functions including, but not limited to, voltage regulation, digital-to-analog conversion, analog-to-digital conversion, storing sensor readings, converting sensor readings to, for example, corresponding occupant weight measurements, etc.

Figure 6:
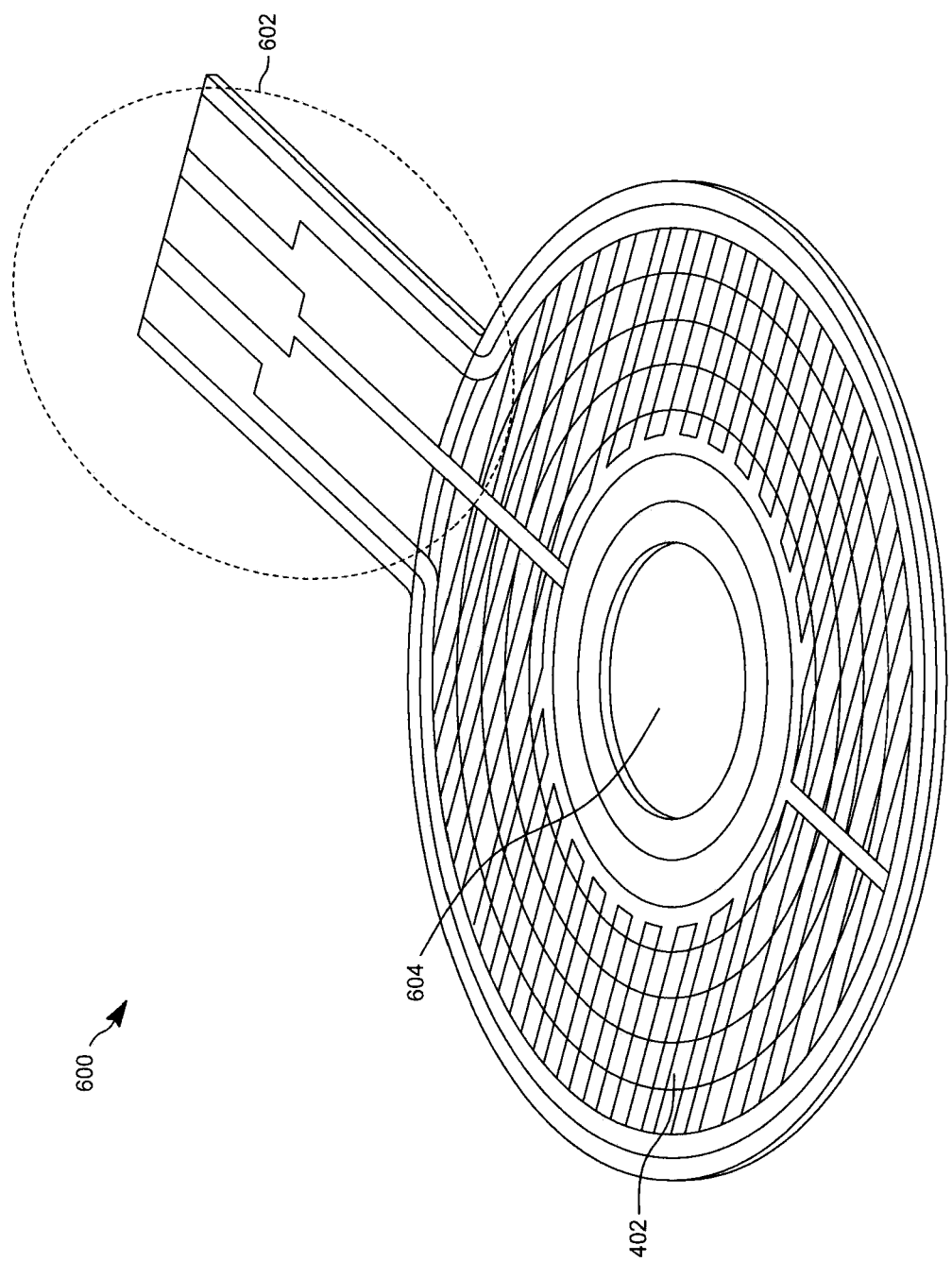
FIG. 6 illustrates a force sensing element of a sensor module according to one example of the present disclosure.

Referring now to FIG. 6, one example of a force sensing element 402 of a sensor module 600 is shown. More specifically, FIG. 6 illustrates a magnified view of the force sensing element 402 of FIG. 4. As can be seen, the force sensing element 402 defines an aperture 604. The aperture 604 may, according to some examples, coincide and align with the aperture defined by the substrate of the sensor module (e.g., aperture 404 shown in FIG. 4) and be configured to allow fastening elements for fastening a seat to a floor pan to pass there through. In addition, FIG. 6 illustrates a tab portion 602 that includes the electrodes of the force sensing element 402. The tab portion 602 may serve to separate the sensing element 402 portion of the sensor module 600 from the other components (e.g., the PCB), so as to protect the other components from being crushed or otherwise damaged by the weight of a seat or the like.

Figure 7:
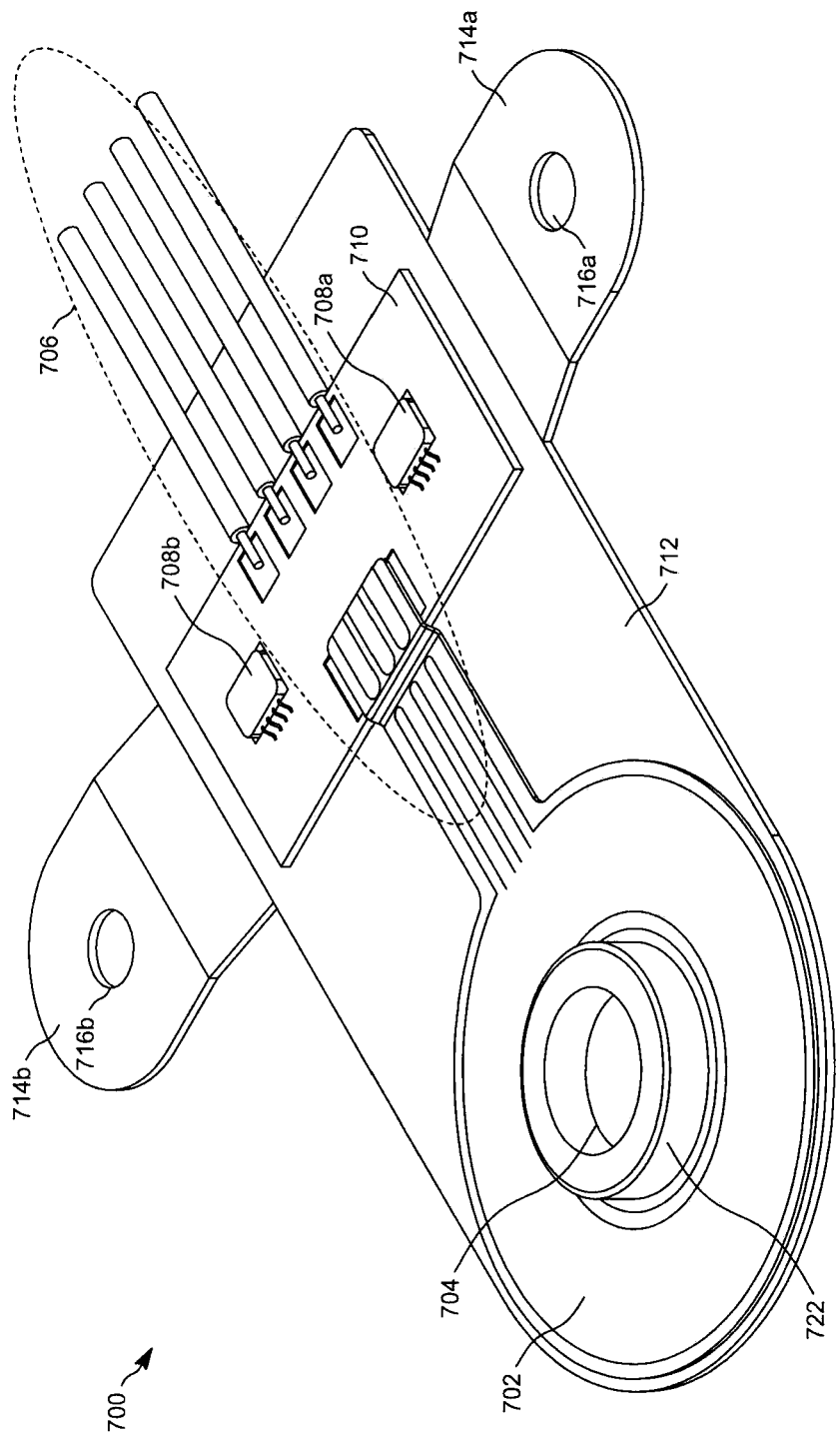
FIG. 7 illustrates a sensor module according to one example of the present disclosure.

FIG. 7 illustrates another example of a sensor module 700. The sensor module 700 may be in included as part of a weight measurement and sensing system according to aspects of the present disclosure. For example, one or more sensor modules having the structure of sensor module 700 may be included as part of a weight measurement and sensing system, such as, but not limited to, systems 108, 208, and 300 described above and/or system 1202 described below. The sensor module 700 includes a substrate 712. The substrate 712 is configured to be mounted between a floor pan and a seat of a vehicle. For example, according to one implementation, a bottom side of the substrate 712 (not shown) may be configured to sit atop a floor pan of a vehicle. The substrate 712 may be manufactured from any suitable material including, but not limited to, metal (e.g., steel or the like) and/or plastic. Furthermore, the substrate 712 may define an aperture 704 configured to surround a fastening element (e.g., a stud, bolt, etc.) used to fasten a seat to a floor pan of a vehicle.

The sensor module 700 is shown to include a collar 722 as part of the substrate 712 (or, according to some implementations, as a separate and distinct element from the substrate 712). The collar 722 may surround the aperture 704 and may be configured to contact a bottom portion of a seat of a vehicle. In one example, the collar 722 may be configured to protrude through an aperture in a mounting foot of a seat to prevent crushing of the force sensing element 702. In addition, the collar 722 may provide a stop limit, for example, when a seat is fastened to a floor pan of a vehicle. As shown, the collar 722 may project away from a floor pan of a vehicle when the sensor module 700 is mounted between the floor pan and a seat.

The sensor module 700 further includes a force sensing element 702 disposed upon the substrate 712. The force sensing element 402 may be configured to sense a force applied thereupon. In one example, the sensed force may be created by a person occupying a seat, where the force is transferred though the seat to the force sensing element 702 of the sensor module 700. In another example, the force may be transferred directly from a person to the force sensing element, such as when a person's foot or feet contact the force sensing element 702 (e.g., when the sensor module 700 is mounted in a foot well portion of a floor pan of a vehicle). In addition, the force sensing element 702 may be configured to generate a reading representative of the force applied thereupon in response thereto to provide a sensor reading.

According to some examples, the force sensing element 702 may be anywhere from 8 to 60 mm in diameter. In one example, the force sensing element 702 may be approximately 46.5 mm in diameter.

In addition, the force sensing element 702 may constitute one or more of the following types of force sensing elements: (i) a force sensitive resistor; (ii) an inductive force sensing element; (iii) an accelerometer force sensing element; and (iv) a piezoelectric force sensing element. Furthermore, according to some example implementations (including the implementation shown in FIG. 7 and the implementations shown in other figures herein), the force sensing element 702 may be configured to detect an amplitude or frequency associated with the substrate 712. In one example of the foregoing implementation, the sensor readings generated by the sensor module 700 may be based on the detected frequency or amplitude.

According to one example where the force sensing element 702 includes a force sensitive resistor, force applied to the force sensing element 702 may cause a resistance to drop across electrodes of the force sensitive resistor. This drop in resistance may cause an increase in voltage across the electrodes of the force sensitive resistor, which voltage may be correlated with a weight of an occupant of a seat. As used herein, correlating a voltage with a weight of an occupant may include: (i) determining a specific weight of an occupant (e.g., within a certain tolerance, such as +/−10 lbs) based on voltage readings from one or more sensors and/or (ii) determining a range of a weight of an occupant (e.g., between 90 to 110 lbs) based on voltage readings from one or more sensors.

The sensor module 700 also includes a wiring harness 706 constituting one or more wires connected to, at least, the force sensing element 702 and configured to, among other things, transmit one or more sensor readings from the sensor module 700 to, for example, a control module (not shown). In addition, the wiring harness 706 may serve to supply power to one or more components (e.g., the forcer sensing element 702, one or more microprocessor 708a, 708b, etc.) of the sensor module 700.

According to certain examples, the substrate may include one or more tabs, such as tabs 714a and 714b. The tabs 714a and 714b may define respective apertures 716a and 716b. The tabs 714a and 714b may facilitate the sensor module 700 being included in a housing. For example, the tabs 714a and 714b and their respective apertures 716a and 716b may facilitate the sensor module 700 being included as part of an over-molded mat, where the apertures 716a and 716b may permit plastic or the like to flow through, thereby connecting top and bottom portions of the housing around the sensor module 700.

According to some implementations, the sensor module 700 may include a printed circuit board (PCB) 710 disposed upon the substrate 712. The PCB 710 may serve to connect the electrodes of the force sensing element 702 to the wiring harness 706. In addition, according to some examples, the PCB 710 may include one or more microprocessors, such as microprocessors 708a and 708b. The microprocessor(s) 708a and/or 708b may perform a variety of functions including, but not limited to, voltage regulation, digital-to-analog conversion, analog-to-digital conversion, storing sensor readings, converting sensor readings to, for example, corresponding occupant weight measurements, etc.

Figure 8:
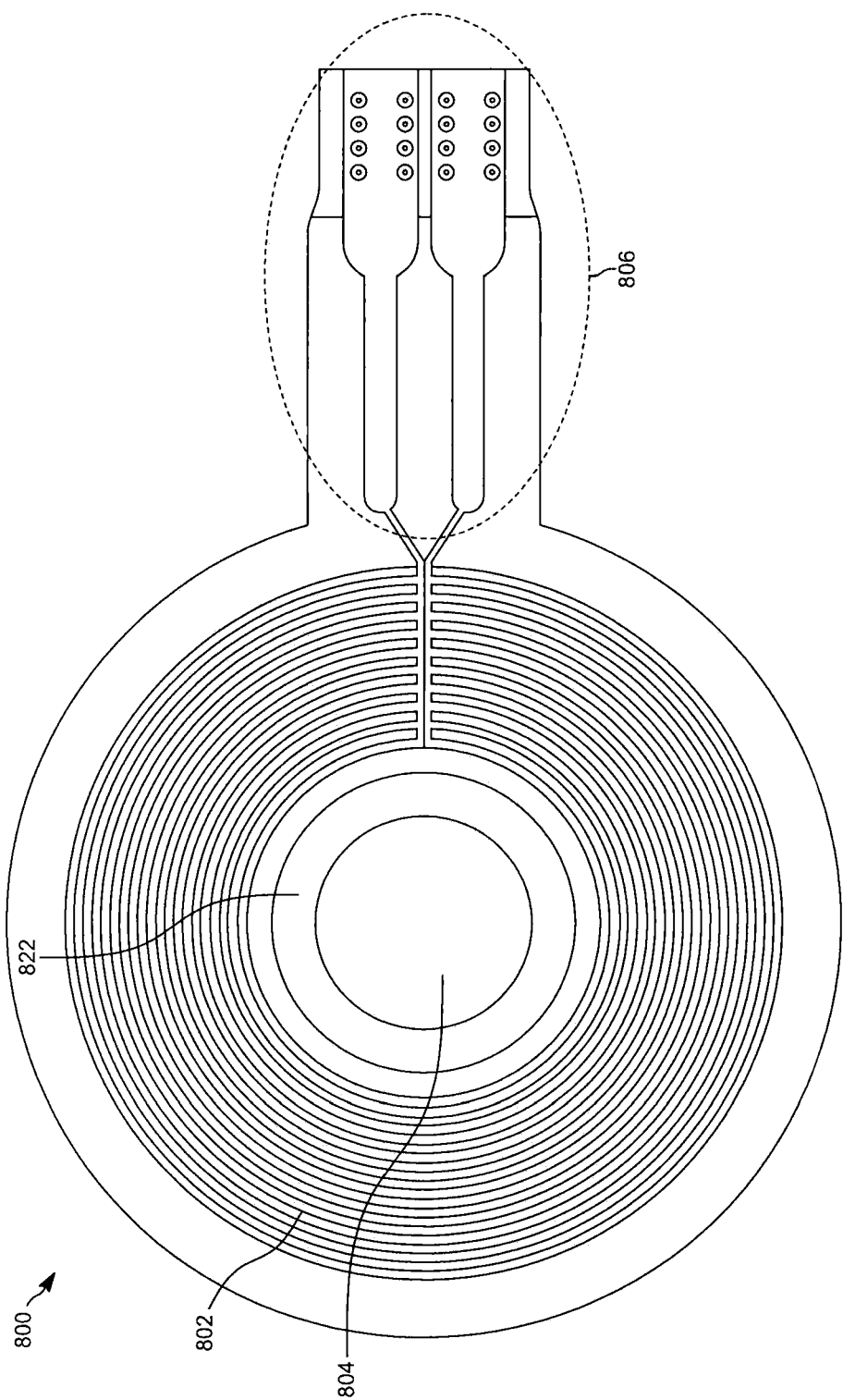
FIG. 8 illustrates a force sensing element of a sensor module according to one example of the present disclosure.

FIG. 8 shows one example of a force sensing element 802 of a sensor module 800. More specifically, FIG. 8 illustrates a magnified view of a force sensing element 802. As can be seen, the force sensing element 802 defines an aperture 804. The aperture 804 may, according to some examples, coincide and align with the aperture defined by the substrate of the sensor module 800 and be configured to allow fastening elements for fastening a seat to a floor pan to pass there through. In addition, FIG. 8 illustrates a tab portion 806 that includes the electrodes of the force sensing element 802. The tab portion 806 may serve to separate the force sensing element 802 portion of the sensor module 800 from the other components (e.g., the PCB), so as to protect the other components from being crushed by the weight of a seat or the like.

In addition, FIG. 8 illustrates a collar 822 surrounding the aperture 804. According to one example, the collar 822 may be included as part of a substrate of the sensor module 800. However, in another example, the collar 822 may be included as part of the force sensing element 802 of the sensor module 800.

Furthermore, as illustrated in FIG. 8, the force sensing element may include an electrode pattern. FIG. 8 illustrates one such exemplary pattern whereby the electrodes of the force sensing element 802 are arranged in an interdigitated pattern. As can be seen, the interdigitated electrodes may be substantially arcuate in shape. However, as described below, additional or alternative electrode patterns may be suitably employed without deviating from the teachings herein. Further, according to some examples set forth herein, the electrode patterns may be created using one or more force sensitive resistor printed inks. According to some examples, different force sensitive resistor printed inks may be blended together to form a blended force sensitive resistor printed ink, which may then be employed to create one or more of the electrode patterns for the force sensing elements shown and described herein.

Figure 9:
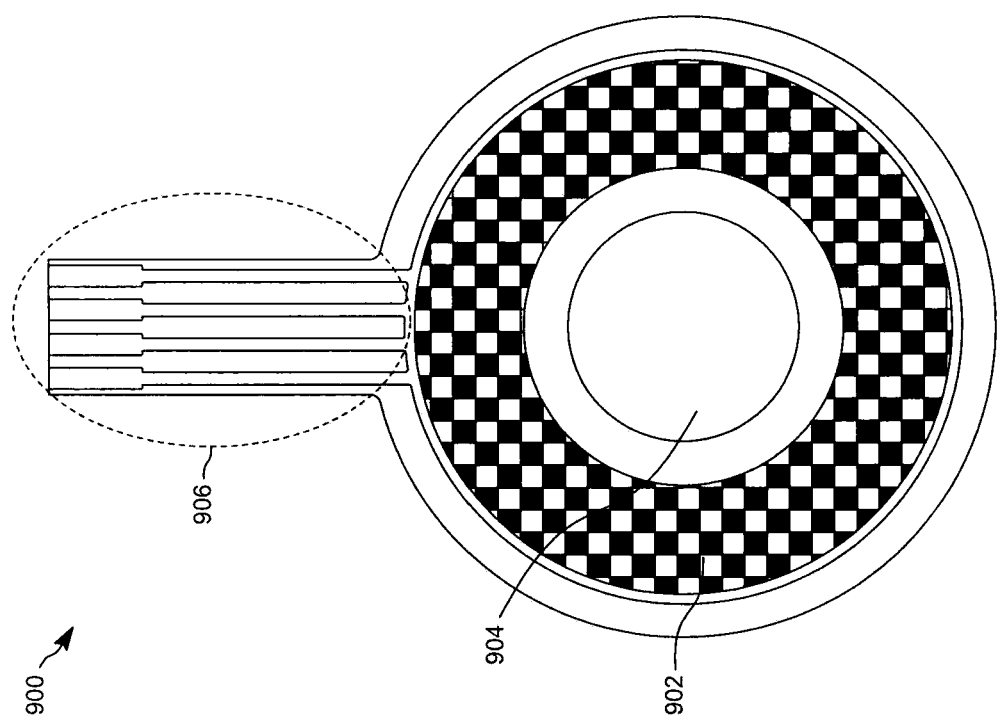
FIG. 9 illustrates a force sensing element of a sensor module according to one example of the present disclosure.

Turning now to FIG. 9, one example of a force sensing element 902 of a sensor module 900 is shown. More specifically, FIG. 9 illustrates a magnified view of a force sensing element 902. As can be seen, the force sensing element 902 defines an aperture 904. The aperture 904 may, according to some examples, coincide and align with the aperture defined by the substrate of the sensor module 900 and be configured to allow fastening elements for fastening a seat to a floor pan to pass there through. In addition, FIG. 9 illustrates a tab portion 906 that includes the electrodes of the force sensing element 902. The tab portion 906 may serve to separate the force sensing element 902 portion of the sensor module 900 from the other components (e.g., the PCB), so as to protect the other components from being crushed by the weight of a seat or the like.

Furthermore, as illustrated in FIG. 9, the force sensing element 902 may include an electrode pattern. FIG. 9 illustrates one such exemplary pattern whereby the electrodes of the force sensing element 902 are arranged in a checkerboard pattern. As can be seen, the electrodes may be substantially square in shape. However, as described below, additional or alternative electrode patterns may be suitably employed without deviating from the teachings herein.

According to one example, the electrodes may be formed with one or more resistive inks. In one example, the white-colored electrodes (i.e., the white "squares" of the checkerboard pattern) may include resistive ink and share a common resistance value, while the black-colored electrodes (i.e., the black "squares" of the checkerboard pattern) may also include resistive ink and share a common resistance value. In some examples, the resistance value shared by the white-colored electrodes may be different than the resistance value shared by the black-colored electrodes. In another example, the resistance value of shared by the white-colored electrodes may be the same as the resistance value shared by the black-colored electrodes.

Sensor module 900 (including, for example, the checkerboard pattern) may be suitably incorporated into any of the various implementations of the weight-measurement and sensing system described herein.

Figure 10:
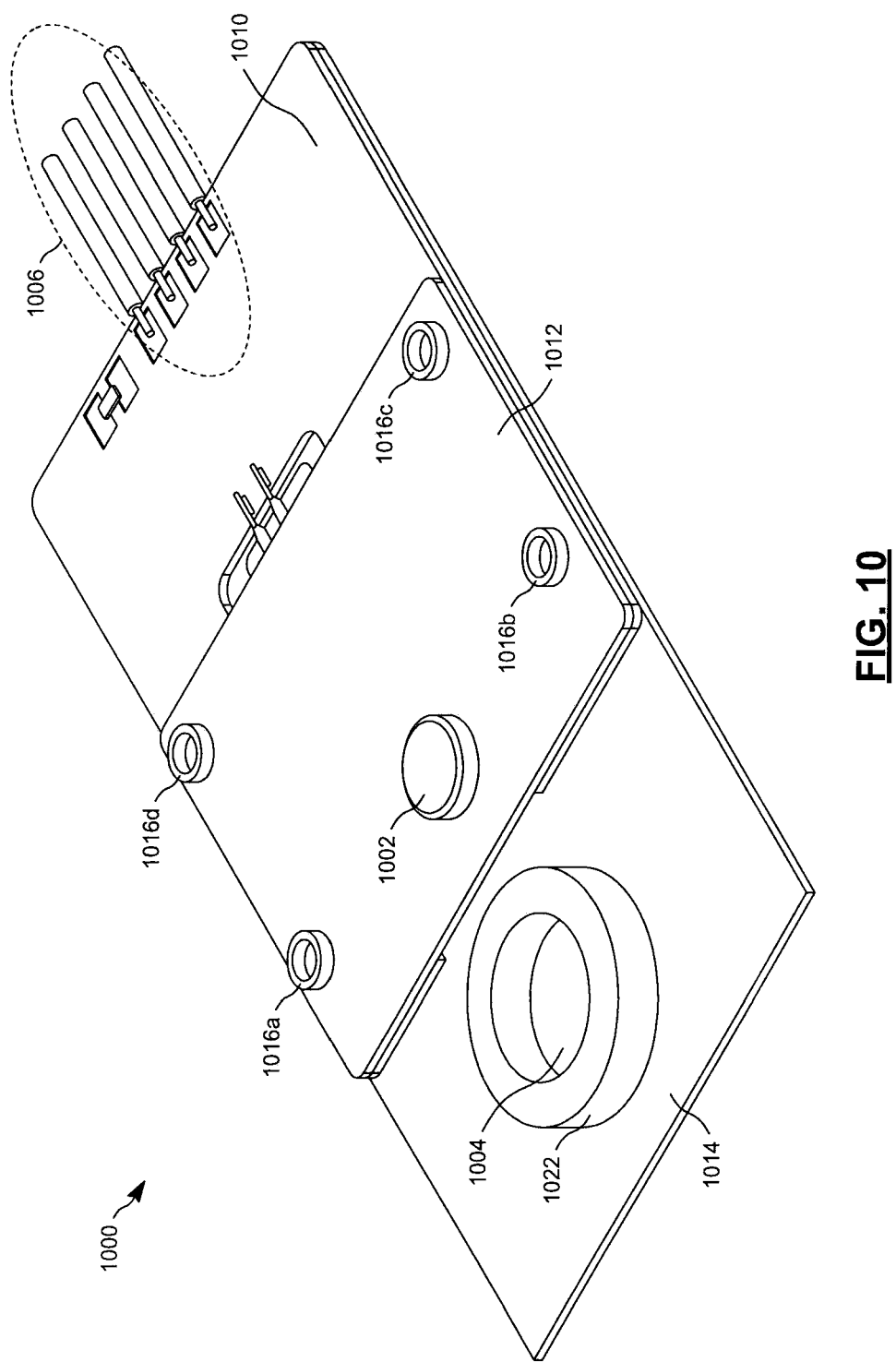
FIG. 10 illustrates a sensor module according to one example of the present disclosure.

With reference to FIG. 10, another example of a sensor module 1000 according to aspects of the present disclosure is shown. The sensor module 1000 may be in included as part of a weight measurement and sensing system according to aspects of the present disclosure. For example, one or more sensor modules having the structure of sensor module 1000 may be included as part of a weight measurement and sensing system, such as, but not limited to, systems 108, 208, and 300 described above and/or system 1202 described below. The sensor module 1000 includes a substrate 1014. The substrate 1014 is configured to be mounted between a floor pan and a seat of a vehicle. For example, according to one implementation, a bottom side of the substrate 1014 (not shown) may be configured to sit atop a floor pan of a vehicle. The substrate 1014 may be manufactured from any suitable material including, but not limited to, metal (e.g., steel or the like) and/or plastic. Furthermore, the substrate 1014 may define an aperture 1004 configured to surround a fastening element (e.g., a stud, bolt, etc.) used to fasten a seat to a floor pan of a vehicle.

The sensor module 1000 is shown to include a collar 1022 as part of the substrate 1014. The collar 1022 may surround the aperture 1004 and may be configured to contact a bottom portion of a seat of a vehicle. In one example, the collar 1022 may be configured to protrude through an aperture in a mounting foot of a seat to prevent crushing of a force sensing element (e.g., a force sensing element disposed on the substrate 1014 and beneath a "puck" 1002). In addition, the collar 1022 may provide a stop limit, for example, when a seat is fastened to a floor pan of a vehicle. As shown, the collar 1022 may project away from a floor pan of a vehicle when the sensor module 1000 is mounted between the floor pan and a seat.

The sensor module 1000 further includes a force sensing element (not shown in FIG. 10) disposed upon the substrate 1014 and beneath the puck 1002. As used herein, a "puck" may constitute a raised projection having a height taller than any of rivets 1016a, 106b, 1016c, and 1016d (or other fastening means used to connect a cover strap 1012 to the substrate 1014). The force sensing element of sensor module 1000 may take any of the various forms of force sensor elements described above. The force sensing element may be configured to sense a force applied thereupon. In one example, the sensed force may be created by a person occupying a seat, where the force is transferred though the seat through the puck 1002 to the force sensing element of the sensor module 1000. In another example, the force may be transferred directly from a person to the puck 1002, and then to the force sensing element, such as when a person's foot or feet contact the puck 1002 (e.g., when the sensor module 1000 is mounted in a foot well portion of a floor pan of a vehicle). In addition, the force sensing element may be configured to generate a reading representative of the force applied thereupon in response thereto to provide a sensor reading.

According to some examples, the force sensing element may be anywhere from 8 to 60 mm in diameter. In one example, the force sensing element may be approximately 46.5 mm in diameter.

In addition, the force sensing element may constitute one or more of the following types of force sensing elements: (i) a force sensitive resistor; (ii) an inductive force sensing element; (iii) an accelerometer force sensing element; and (iv) a piezoelectric force sensing element. Furthermore, according to some example implementations (including the implementation shown in FIG. 10 and the implementations shown in other figures herein), the force sensing element may be configured to detect an amplitude or frequency associated with the substrate 1014. In one example of the foregoing implementation, the sensor readings generated by the sensor module 1000 may be based on the detected frequency or amplitude.

According to one example where the force sensing element includes a force sensitive resistor, force applied to the force sensing element may cause a resistance to drop across electrodes of the force sensitive resistor. This drop in resistance may cause an increase in voltage across the electrodes of the force sensitive resistor, which voltage may be correlated with a weight of an occupant of a seat. As used herein, correlating a voltage with a weight of an occupant may include: (i) determining a specific weight of an occupant (e.g., within a certain tolerance, such as +/−10 lbs) based on voltage readings from one or more sensors and/or (ii) determining a range of a weight of an occupant (e.g., between 90 to 110 lbs) based on voltage readings from one or more sensors.

The sensor module 1000 also includes a wiring harness 1006 constituting one or more wires connected to, at least, the force sensing element and configured to, among other things, transmit one or more sensor readings from the sensor module 1000 to, for example, a control module (not shown). In addition, the wiring harness 1006 may serve to supply power to one or more components (e.g., the forcer sensing element, etc.) of the sensor module 1000.

According to some implementations, the sensor module 1000 may include a printed circuit board (PCB) 1010 disposed upon the substrate 1014. The PCB 1010 may serve to connect the electrodes of the force sensing element to the wiring harness 1006.

Furthermore, according to some examples, the sensor module 1000 may include a cover strap 1012 disposed upon the PCB 1010. The cover strap 1012 may be manufactured using any suitable materials known in the art including, but not limited to, metal and/or plastic. The cover strap 1012 may be fastened to the PCB via suitable fastening means including, but not limited to, rivets 1016a, 106b, 1016c, and 1016d. In addition, the cover strap 1012 may include a puck 1002. The puck 1002 may be configured to be disposed between the force sensing element and the seat when the sensor module 1000 is mounted between the floor pan and the seat.

According to one example, the puck 1002 may be aligned coaxial with the force sensing element and contact the force sensing element to transfer force from the seat to the force sensing element. Although shown as circular, the puck 1002 may take any suitable shape (e.g., square, rectangular, hexagonal, etc.), and may project away from the floor pan of a vehicle when mounted between the floor pan and the seat. The puck 1002 may be further configured to contact the force sensing element on a first side and contact a bottom portion of the seat of a vehicle on a second side opposite the first side. The puck may be manufactured from any suitable material known in the art including, but not limited to, metal and or plastic.

Figure 11:
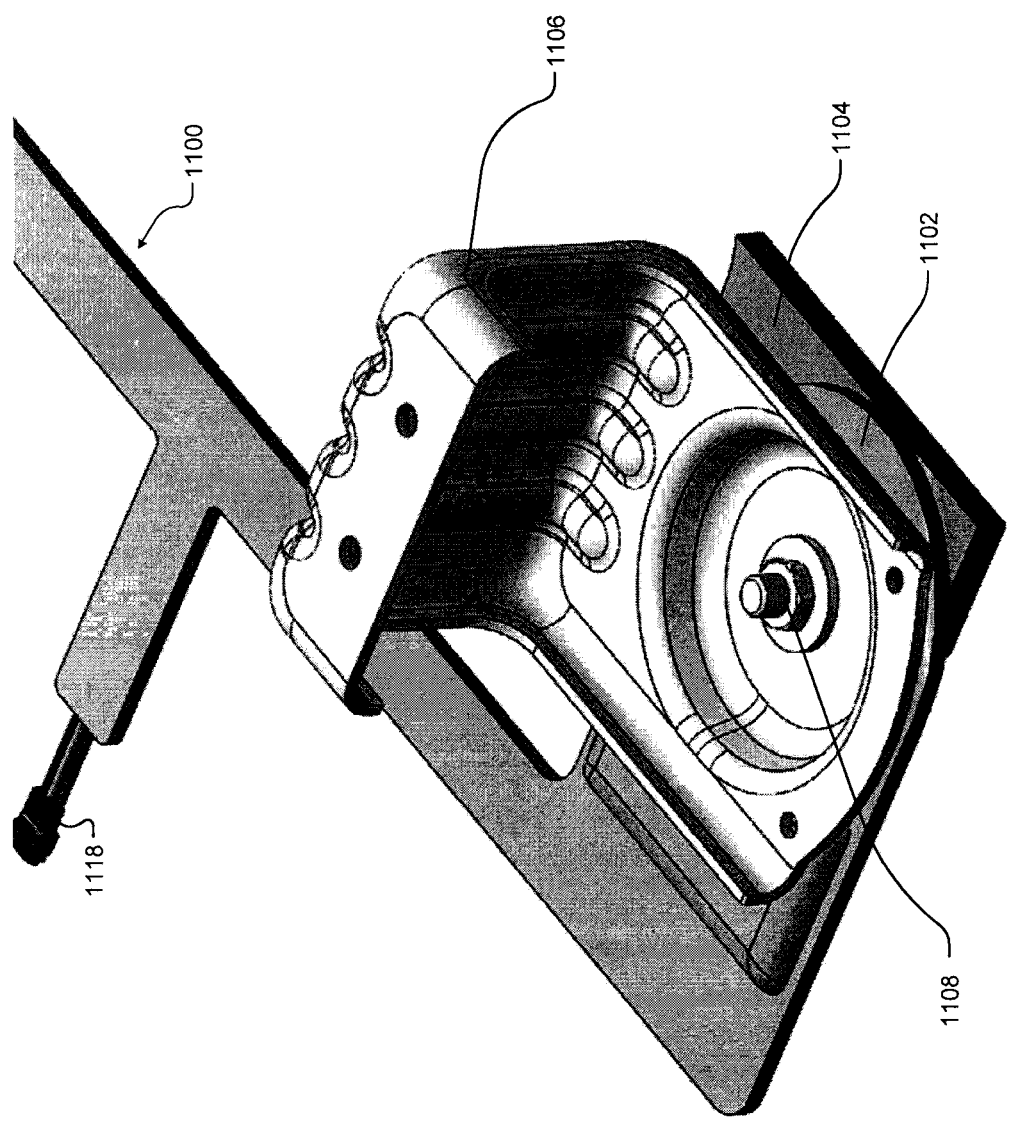
FIG. 11 is a front isometric view of a weight measurement and sensing system mounted between a floor pan and a mounting foot of a seat of a vehicle according to one example of the present disclosure.

Referring now to FIG. 11, a front isometric view of a weight measurement and sensing system 1100 mounted between a floor pan 1104 and a mounting foot 1106 of a seat of a vehicle is shown. More specifically, FIG. 11 illustrates how the weight measurement and sensing system 1100 may be sandwiched between an attachment point for a seat (e.g., the mounting foot 1106 in the example of FIG. 11) and the floor pan 1104 of the vehicle when the seat is installed.

The weight measurement and sensing system 1100 may be similar to the system 300 shown in FIG. 3 herein. According to one example, only a portion of the system 1100 is shown in FIG. 11, for simplicity. For example, the system 1100 of FIG. 11 is only shown to include a single sensor module 1102 (encapsulated within a protective mat according to the example of FIG. 11) corresponding to a single mounting foot 1106 of a seat. However, it is understood that the system 1100 may include additional sensor modules (corresponding, for example, to one or more additional mounting feet, or a foot well), as desired. In addition, the system 1100 is shown to include a control output interface 1118 configured to communicatively couple with, for example, a safety systems control module of the vehicle.

A fastening element 1108 (e.g., a stud, bolt, etc.) is shown running through an aperture of the sensor module 1102 (the aperture is not visible in FIG. 11) to connect the mounting foot 1106 to the floor pan 1104 of the vehicle. Accordingly, FIG. 11 illustrates how force (e.g, force generated from the weight of an occupant of the seat) may be translated from the seat, through the attachment point of the seat (e.g., the mounting foot 1106) and distributed about a force sensing element of the sensor module 1102 when the seat is fully installed in the vehicle.

Figure 12:
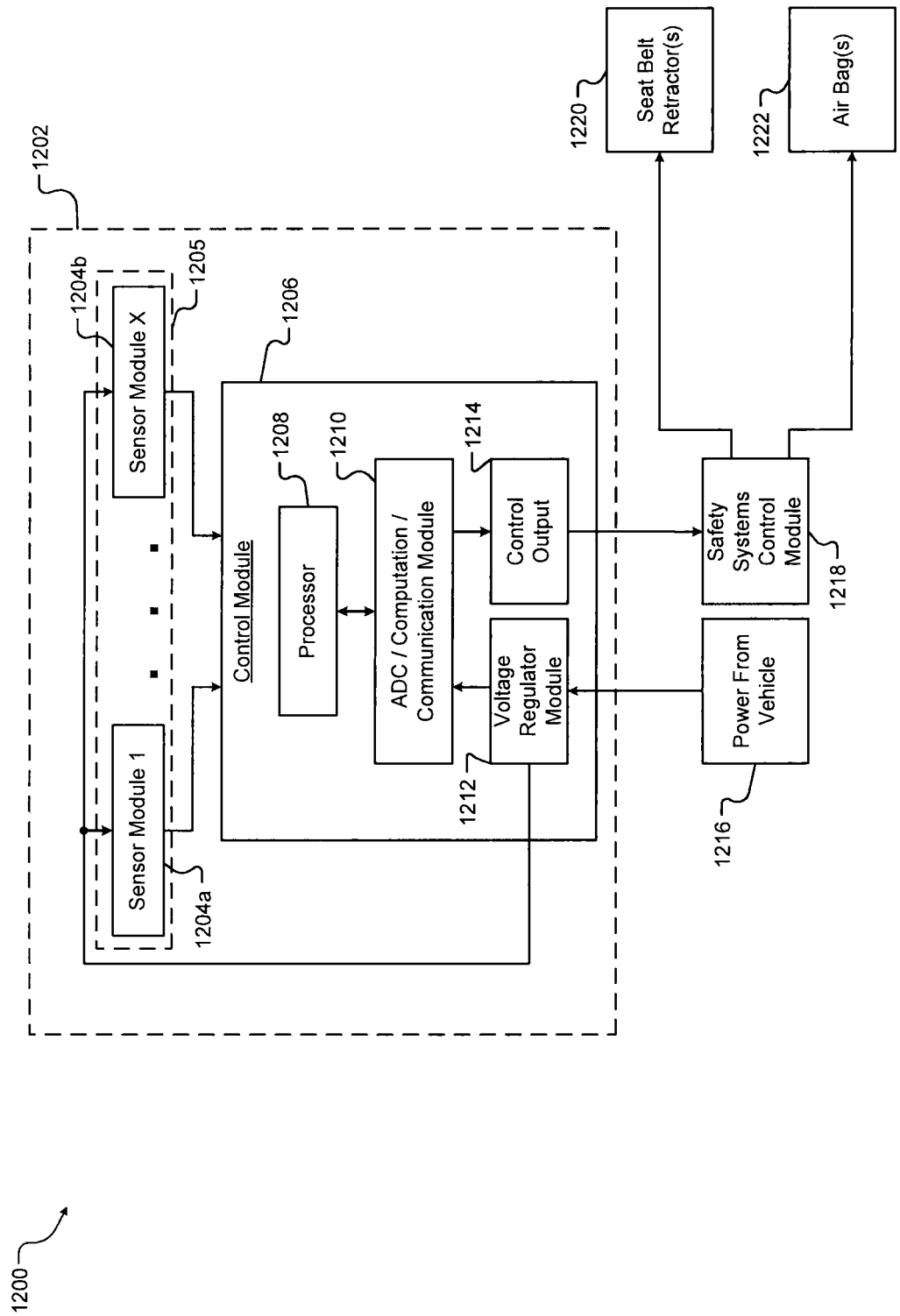
FIG. 12 is a functional block diagram illustrating a weight measurement and sensing system according to one example of the present disclosure.

Referring now to FIG. 12, a vehicle 1200 including a weight measurement and sensing system 1202 installed therein is shown. The weight measurement and sensing system 1202 may include a plurality of sensor modules (e.g., sensor module 1 1204a through sensor module x 1204b, where x is an integer larger than 1), the plurality of sensor modules collectively constituting a sensor assembly 1205. The sensor assembly 1205 may be connected to a control module 1206, for example, through wiring harnesses and the like. The control module 1206 may include a processor 1208, suitable memory (not shown) connected to the processor 1208, a ADC/Computation/Communication Module 1210 connected to the processor 1208, a voltage regulator module 1212 connected to the ADC/Computation/Communication Module 1210, and a control output interface 1214 connected to the ADC/Computation/Communication Module 1210.

The voltage regulator module 1212 of the control module 1206 may be connected to a vehicular power source 1216, such as a battery or the like. The control output interface 1214 may be connected to a safety systems control module 1218 of the vehicle 1200. The safety systems control module 1218 may be connected to one or more vehicular safety components of the vehicle 1200, such as one or more seat belt retractors 1220 and/or one or more air bags 1222.

In operation, the weight measurement and sensing system 1202 may function as follows. The sensor modules 1204a-1204b of the sensor assembly 1205 may sense forces applied thereupon and may generate respective readings representative of the forces applied thereupon in response thereto to provide a plurality of sensor readings. The control module 1206 may determine a weight of an occupant of a seat of the vehicle 1200 based on the plurality of sensor readings. For example, the control module 1206 may determine the weight of the occupant by applying a weight determination algorithm utilizing the plurality of sensor readings. Examples of the weight determination algorithm are described below with regard to FIG. 13.

In some examples, the control module 1206 may be further configured to determine a center of mass of the occupant of the seat based on the plurality of sensor readings and a distance between a front seat bolt and a rear seat bolt. The distance between the front seat bolt and the rear seat bolt may be determined, for example, via one or more sensors located in the vehicle capable of tracking seat position. Other suitable means for determining the distance between the front seat bolt and the rear seat bolt may be equally employed without deviating from the teachings herein. Examples of algorithms for determining the center of mass the occupant of the seat are described below with regard to FIG. 14.

The control module 1206 is further configured to issue a command to the safety systems control module 1218 of the vehicle 1200 to adjust a deployment strength of a vehicular safety component of the vehicle 1200 (e.g., the seat belt retractor(s) 1220 and/or air bag(s) 1222) based on (i) a determined weight of the occupant of the seat and/or (ii) a determined center of mass of the occupant of the seat. For example, whereas conventional weight sensing and measurement systems could merely instruct a safety systems control module 1218 to deploy or not deploy a vehicular safety component, the weight sensing and measurement system 1202 of the present disclosure may instruct a safety systems control module 1218 to deploy a vehicular safety component at a particular strength.

According to some examples, the strength at which a given vehicular safety component is to be deployed may vary based on the weight and/or center of mass of the occupant of the seat. Thus, by way of example and not limitation, upon a determination that the occupant of a seat has a first weight and/or center of mass, a vehicular safety component may be deployed at a first strength. Correspondingly, upon a determination that the occupant of a seat has a second weight and/or center of mass that differs from the first weight and/or center of mass, a vehicular safety component may be deployed at a second strength that differs from the first strength.

In this manner, the strength at which a vehicular safety component may be deployed may be finely tailored to the strength and/or center of mass of the occupant. Among other advantages, the system 1202 of the present disclosure may prevent children from being injured, for example, when an air bag deploys (or a seat belt retracts) at strength that is dangerous for a child. Conversely, the system 1202 may ensure an airbag and/or seat belt retractor deploys with sufficient strength, for example, when the occupant is a large adult. This represents a significant improvement over conventional systems where vehicular safety component are known to deploy only at a single strength.

The ADC/Computation/Communication Module 1210 of the control module 1206 may perform functions including, but not limited to, digital-to-analog conversion, analog-to-digital conversion, computation (e.g., determining a weight and/or center of mass of an occupant of a seat of the vehicle based on the sensor readings), and communication with components internal and external to the system 1202 using communication protocols and techniques known in the art. Finally, the voltage regulator module 1212 may be configured to regulate respective voltages across the sensor assembly 1205.

Figure 13:
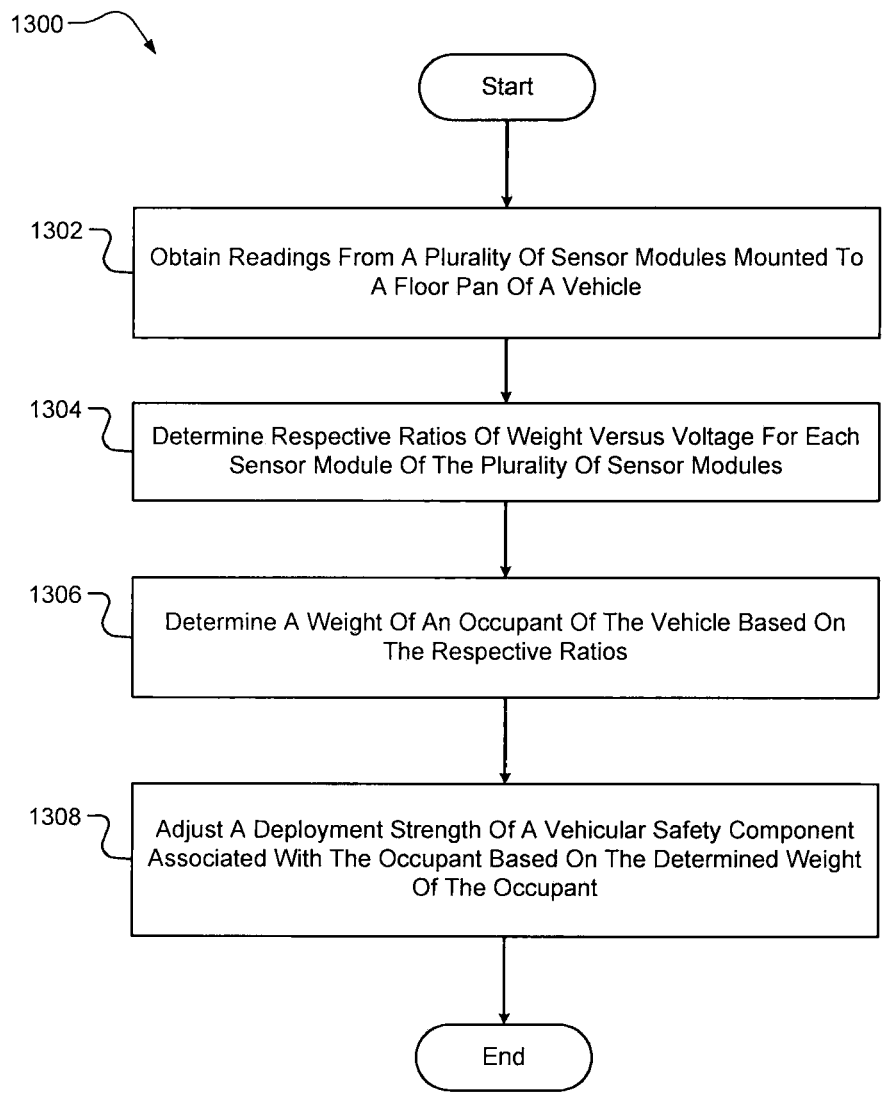
FIG. 13 is a flowchart illustrating a method of adjusting a strength of a vehicular safety component based on a determined weight of an occupant of a vehicle.

FIG. 13 is a flowchart describing a method 1300 for adjusting a strength of a vehicular safety component based on a determined weight of an occupant of a vehicle. The method 1300 begins at 1302 where readings are obtained from a plurality of sensor modules mounted to a floor pan of a vehicle. At 1304, respective ratios of weight versus voltage are determined for each sensor module of the plurality of sensor modules. At 1306, a weight of an occupant of the vehicle is determined based on the respective ratios. According to one example, the determined weight of the occupant of the vehicle may be given by the following equation:

$$\text{Weight of Occupant} = 2*(k_{A12}*A12 + k_{A15}*A15) \quad (1)$$

Where $k_{A12}$ and $k_{A15}$ equals the average slope of the graph (lbs./volts) for each sensor module. According to some examples, depending on the applied weight, the output may range from 0 to 3 volts.

Lastly, at 1308, a deployment strength of a vehicular safety component associated with the occupant may be adjusted based on the determined weight of the occupant. For example, a deployment strength may be set (i.e., initialized), increased, or decreased based on the determined weight of the occupant.

Figure 14:
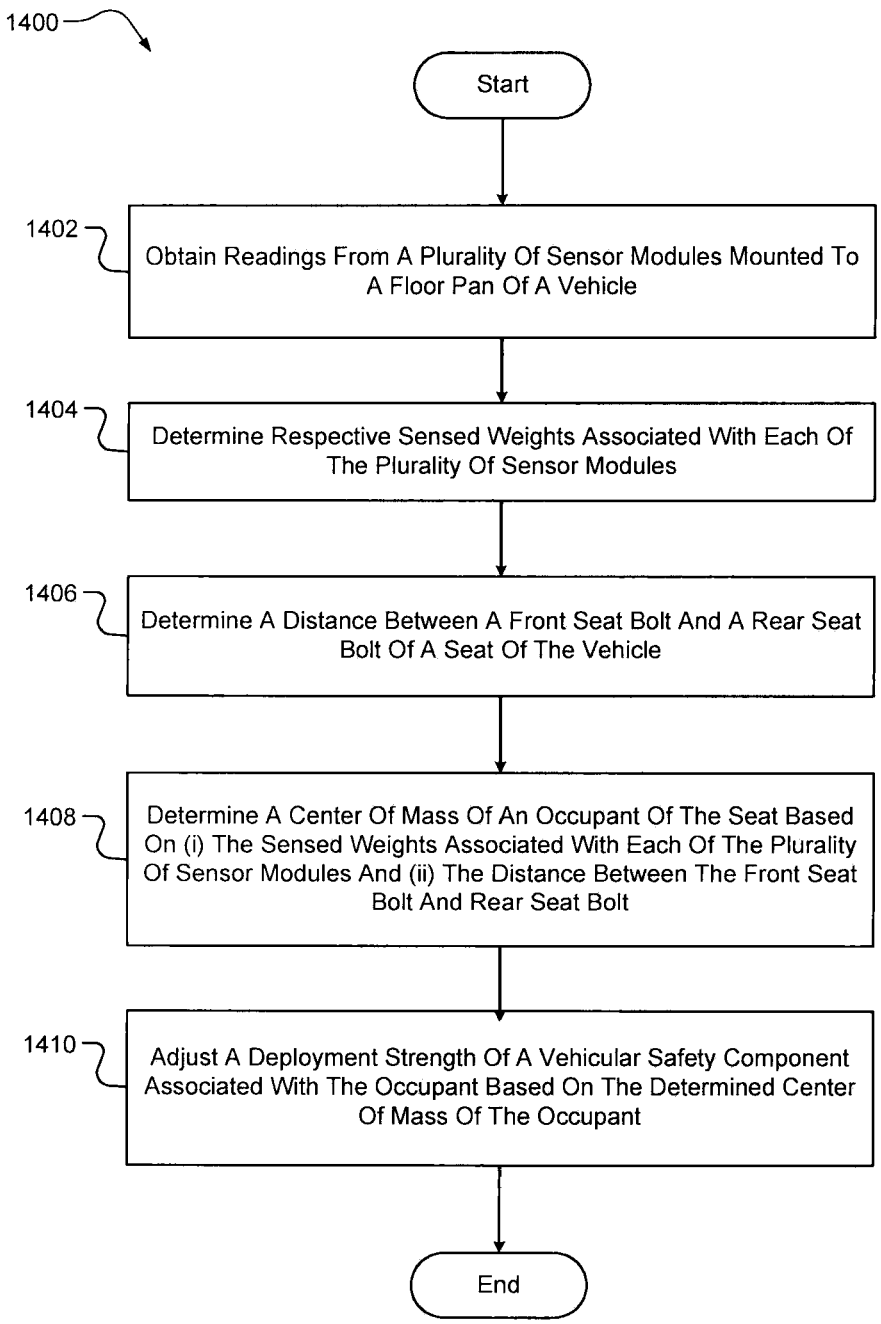
FIG. 14 is a flowchart illustrating a method of adjusting a strength of a vehicular safety component based on a determined center of mass of an occupant of a vehicle.

FIG. 14 is a flowchart describing a method 1400 for adjusting a strength of a vehicular safety component based on a determined center of mass of an occupant of a vehicle. The method 1400 begins at 1402 where readings are obtained from a plurality of sensor modules mounted to a floor pan of a vehicle. At 1404, respective sensed weights associated with each of the plurality of sensor modules are determined. According to one example, the sensed weights may be determined by comparing voltage readings from the sensor modules to a look-up table or the like. At 1406, a distance between a front seat bolt and a rear seat bolt of a seat of the vehicle is determined. The distance may be determined, for example, by various sensors installed in the vehicle, and/or via known specifications of the vehicle and/or seat.

At 1408, a center of mass of an occupant of the seat is determined based on (i) the sensed weights associated with each of the plurality of sensor modules and (ii) the distance between the front seat bolt and rear seat bolt. For example, the center of mass of an occupant of the seat may given by the following equation:

$$D = X*M_R/M_R + M_f \quad (2)$$

Where (i) D is the position of the center of mass with respect to the front bolt; (ii) X is the distance between the seat bolts (front and rear); (iii) $M_R$ is the weight sensed by a first sensor module (e.g., a sensor module mounted beneath a back-left mounting foot of the seat); and (iv) $M_F$ is the weight sensed by a second sensor module (e.g., a sensor modules mounted beneath a front-right mounting foot of the seat).

Lastly, at 1410, a deployment strength of a vehicular safety component associated with the occupant may be adjusted based on the determined center of mass of the occupant. For example, a deployment strength may be set (i.e., initialized), increased, or decreased based on the determined center of mass of the occupant.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A sensor module comprising:
   a substrate configured to be mounted between a floor pan of a vehicle and a seat of the vehicle;
   a force sensing element disposed directly upon the substrate and configured to:
   sense a force applied thereupon; and
   generate a reading representative of the force applied thereupon in response thereto to provide a sensor reading,
   a wiring harness connected to the force sensing element and configured to transmit the sensor reading to a control module,
   wherein the substrate defines an aperture configured to surround a fastening element used to fasten the seat to the floor pan of the vehicle, and wherein the force sensing element defines an aperture aligned with the aperture defined by the substrate, and the substrate further comprises a collar circumscribing the apertures and configured to protrude through an aperture in a mounting foot of a seat, whereby crushing of the force sensing element is prevented when the sensor module is mounted between a floor pan of a vehicle and a seat of a vehicle.

2. The sensor module of claim 1, further comprising a printed circuit board disposed upon the substrate and connected to the wiring harness.

3. The sensor module of claim 2, wherein the printed circuit board comprises at least one microprocessor.

4. The sensor module of claim 2, further comprising a cover strap disposed upon the printed circuit board.

5. A sensor module comprising:
   a substrate configured to be mounted between a floor pan of a vehicle and a seat of the vehicle;

a force sensing element disposed directly upon the substrate and configured to:

sense a force applied thereupon; and generate a reading representative of the force applied thereupon in response thereto to provide a sensor reading, a wiring harness connected to the force sensing element and configured to transmit the sensor reading to a control module, wherein the substrate defines an aperture configured to surround a fastening element used to fasten the seat to the floor pan of the vehicle, the force sensing element defines an aperture aligned with the aperture defined by the substrate, and the substrate further comprises a collar circumscribing the apertures and configured to protrude through an aperture in a mounting foot of a seat, whereby crushing of the force sensing element is prevented when the sensor module is mounted between a floor pan of a vehicle and a seat of a vehicle, wherein further comprising a printed circuit board disposed upon the substrate and connected to the wiring harness, further comprising a cover strap disposed upon the printed circuit board, wherein the cover strap comprises a puck configured to be disposed between the force sensing element and the seat when the sensor module is mounted between the floor pan and the seat.

6. The sensor module of claim 5, wherein the substrate comprises at least one tab, and wherein the at least one tab defines a tab aperture.

7. The sensor module of claim 6, wherein the at least one tab comprises a plurality of tabs, and wherein at least some of the plurality of tabs define respective tab apertures.

8. The sensor module of claim 5, wherein the substrate comprises a collar surrounding the aperture, and wherein the collar is configured to contact a bottom portion of the seat of the vehicle.

9. The sensor module of claim 8, wherein the collar projects away from the floor pan of the vehicle when the sensor module is mounted between the floor pan and the seat.

10. The sensor module of claim 5, wherein the force sensing element comprises a pattern of interdigitated electrodes.

11. The sensor module of claim 10, wherein the interdigitated electrodes are substantially arcuate in shape.

12. The sensor module of claim 5, wherein the force sensing element comprises a checkerboard pattern of electrodes.

13. The sensor module of claim 12, wherein the electrodes are substantially square in shape.

14. The sensor module of claim 5, wherein the puck is aligned coaxial with the force sensing element.

15. The sensor module of claim 5, wherein the puck is configured to contact the force sensing element on a first side and contact a bottom portion of the seat of the vehicle on second side.

16. The sensor module of claim 5, wherein the cover strap is secured to the printed circuit board by a plurality of fastening elements.

17. The sensor module of claim 16, wherein the plurality of fastening elements comprise a plurality of rivets.

18. The sensor module of claim 5, wherein the force sensing element comprises a force-sensitive resistor.

19. The sensor module of claim 5, wherein the force sensing element comprises at least one of the following types of force sensing elements: (i) an inductive force sensing element; (ii) an accelerometer force sensing element; and (iii) a piezoelectric force sensing element.

20. The sensor module of claim 5, wherein the force sensing element is further configured to detect an amplitude or frequency associated with the substrate, and wherein the reading representative of the force is based on the detected amplitude or frequency.

* * * * *